(12) United States Patent
Hammer et al.

(10) Patent No.: US 10,823,212 B2
(45) Date of Patent: Nov. 3, 2020

(54) COMPONENT CONNECTION

(71) Applicant: Bayerische Motoren Werke Aktiengesellschaft, Munich (DE)

(72) Inventors: Maik Hammer, Bruckberg (DE); Johann Van Niekerk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 525 days.

(21) Appl. No.: 15/164,964

(22) Filed: May 26, 2016

(65) Prior Publication Data

US 2016/0265568 A1  Sep. 15, 2016

Related U.S. Application Data

(63) Continuation of application No. PCT/EP2014/078123, filed on Dec. 17, 2014.

(30) Foreign Application Priority Data

Jan. 15, 2014 (DE) .................. 10 2014 200 551

(51) Int. Cl.
*F16B 5/06* (2006.01)
*F16B 21/07* (2006.01)

(52) U.S. Cl.
CPC ............ *F16B 5/0664* (2013.01); *F16B 5/065* (2013.01); *F16B 21/071* (2013.01)

(58) Field of Classification Search
CPC ....... A63H 33/102; F16B 5/06; F16B 5/0607; F16B 5/0621; F16B 5/0642; F16B 5/065;
(Continued)

(56) References Cited

U.S. PATENT DOCUMENTS 2,275,900 A * 3/1942 Hall .................. F16B 5/0642
24/662
3,129,472 A  4/1964 Hensel
(Continued)

FOREIGN PATENT DOCUMENTS

CN  102834626 A  12/2012
CN  103079749 A  5/2013
(Continued)

OTHER PUBLICATIONS

Chinese Office Action issued in counterpart Chinese Application No. 201480058770.X dated Aug. 14, 2017 with English translation (14 pages).
(Continued)

*Primary Examiner* — Michael P Ferguson
(74) *Attorney, Agent, or Firm* — Crowell & Moring LLP

(57) ABSTRACT

A component connection is provided, having a first component in which a first hole is provided, a second component in which a second hole is provided, and a connecting element which has two interconnected spheres or two interconnected spherical elements. Centers of the two spheres or spherical elements are located on a straight line which extends perpendicular to a first equatorial plane of the first sphere or of the first spherical element. Perpendicular to a second equatorial plane of the second sphere or the second spherical element, an edge of the first hole and an edge of the second hole both extend into an undercut area situated between the two equatorial planes such that an interlocking and/or frictional connection is produced in the undercut area. The connection resists pulling-apart forces acting on the two components.

3 Claims, 1 Drawing Sheet

(58) Field of Classification Search
CPC ...... F16B 21/07; F16B 21/073; F16B 21/075; Y10T 403/75
See application file for complete search history.

(56) References Cited

U.S. PATENT DOCUMENTS

| | | | |
|---|---|---|---|
| 4,158,335 A | | 6/1979 | Belcastro et al. |
| 4,637,116 A | * | 1/1987 | Parisch ................. F16B 5/0642 228/115 |
| 5,306,198 A | * | 4/1994 | Forman ................. A63H 33/10 446/116 |
| 5,562,375 A | | 10/1996 | Jackson |
| 5,645,464 A | * | 7/1997 | Chen ..................... A63H 33/10 403/300 |
| 9,631,655 B2 | * | 4/2017 | Van Niekerk ......... F16B 5/0642 |
| 2013/0036594 A1 | | 2/2013 | Hammer et al. |
| 2013/0071181 A1 | | 3/2013 | Herzinger et al. |
| 2013/0185916 A1 | | 7/2013 | Mantei et al. |
| 2014/0143989 A1 | | 5/2014 | Herzinger et al. |

FOREIGN PATENT DOCUMENTS

| | | |
|---|---|---|
| DE | 86 26 765.5 U1 | 1/1987 |
| DE | 10 2010 040 547 A1 | 3/2012 |
| DE | 10 2010 042 803 A1 | 4/2012 |
| DE | 10 2011 087 282 A | 2/2013 |
| GB | 2470179 A | 11/2010 |
| WO | WO 2012/038777 A1 | 3/2012 |
| WO | WO 2013/017381 A1 | 2/2013 |

OTHER PUBLICATIONS

Chinese-language Office Action issued in counterpart Chinese Application No. 201480058770.X dated Mar. 2, 2018 with English translation (twelve (12) pages).

International Search Report (PCT/ISA/210) issued in PCT Application No. PCT/EP2014/078123 dated Mar. 17, 2015, with English translation (six (6) pages).

German Office Action issued in counterpart German Application No. 10 2014 200 551.5 dated Nov. 14, 2014 (five (5) pages).

Chinese-language Office Action issued in counterpart Chinese Application No. 201480058779.X dated Dec. 12, 2016 with English translation (13 pages).

Chinese-language Office Action issued in counterpart Chinese Application No. 201480058770.X dated Sep. 29, 2018 with English translation (13 pages).

* cited by examiner

COMPONENT CONNECTION

CROSS REFERENCE TO RELATED APPLICATIONS

This application is a continuation of PCT International Application No. PCT/EP2014/078123, filed Dec. 17, 2014, which claims priority under 35 U.S.C. § 119 from German Patent Application No. 10 2014 200 551.5, filed Jan. 15, 2014, the entire disclosures of which are herein expressly incorporated by reference.

This application contains subject matter related to U.S. application Ser. No. 15/164,970, entitled "Component Connection and method for Connecting Two Components" filed on even date herewith.

BACKGROUND AND SUMMARY OF THE INVENTION

The present invention relates to a component connection having a first component, in which a first hole is provided, a second component, in which a second hole is provided, and a connecting element, which has two balls connected to one another or two ball-shaped elements connected to one another, wherein center points of the two balls or ball-shaped elements are located on a straight line.

Such a component connection is known from WO 2013 017381 A1. FIG. 3 of WO 2013 017381 A1 discloses a component connection having two metal sheets each with a through-hole. Extending through the through-hole is a connecting element, which is formed by an adjusting element with a ball welded onto each of its opposite ends. A clip element is clipped onto each of the two balls. The clip elements engage over the through-holes provided in the two metal sheets and clip the two metal sheets together.

It is an object of the invention to provide a component connection which is of a more straightforward design and can be produced in a cost-effective manner.

This and other objects are achieved in accordance with the invention by providing a component connection having a first component, in which a first hole is provided, and a second component, in which a second hole is provided. The two components may be, for example, in sheet form, i.e. components made of metal, made of plastic or of other materials. The two components may also consist of different materials. For example, it is possible for the first component to be a metal sheet (e.g. a steel sheet, an aluminum sheet or the like) and for the second component to be a plastic component, in particular a fiber-reinforced plastic component.

The component connection also has a connecting element, which, in turn, has two balls (spheres) connected to one another or two ball-shaped (sphere-shaped) elements connected to one another. The balls or ball-shaped elements may be connected to one another directly, e.g. via a weld connection. As an alternative, they may also be connected to one another via a connecting piece, e.g. using a weld connection in each case. The connecting piece may be, for example, a plate-like or disk-like component or a bolt-like component. If the balls or ball-shaped elements are connected to one another via a bolt-like component, the connecting element is of dumbbell-like configuration.

The center points of the two balls or ball-shaped elements are located on a straight line which is perpendicular to a first equator plane of the first ball or of the first ball-shaped element and is perpendicular to an equator plane of the second ball or of the second ball-shaped element.

According to the invention, a periphery of the first hole and a periphery of the second hole each project into an undercut region located between the two equator planes, this resulting, in the undercut region, in a form fit and/or friction fit which counters "pulling-apart forces" acting on the two components. A form fit and/or friction fit is thus generated between the two components in the region of the two holes solely via the connecting element.

In contrast to WO 2013 017381 A1, which is mentioned above, there is therefore no need for any further components, e.g. clip elements, in order to establish a form fit and/or friction fit between the two components in the region of the two holes. To this extent, the present component connection is of particularly straightforward design and is cost-effective. According to the present invention, the two components thus engage in a form-fitting and/or friction-fitting manner in the undercut region of the connecting element.

According to a development of the invention, it is provided that the periphery of the first hole abuts with clamping action against the first ball or the first ball-shaped element and/or the periphery of the second hole abuts with clamping action against the second ball or the second ball-shaped element.

If the two balls or ball-shaped elements of the connecting element are connected to one another via a spacer, it may be provided that the two balls or ball-shaped elements are each welded to the spacer. The connecting element may be produced entirely or partially from metal, e.g. from steel or aluminum. As an alternative, however, it is also possible for the connecting element to be produced from some other material, e.g. plastic.

It may also be provided that the periphery of the first hole has at least one bent, "clamping-collar-like element", which butts against the first ball or the first ball-shaped element. In particular it is possible for a plurality of clamping-collar-like elements to be distributed in the circumferential direction of the first hole and butt against the first ball or the first ball-shaped element.

The periphery of the second hole may have an analogous configuration, i.e. it may be provided that the periphery of the second hole has at least one bent, clamping-collar-like element, which butts against the second ball or the second ball-shaped element. It is also possible, in an analogous manner, for a plurality of clamping-collar-like elements to be distributed along the periphery of the second hole.

The at least one clamping-collar-like element of the first and/or the second hole is preferably elastically flexible. The at least one clamping-collar-like element of the first and/or the second hole can thus butt resiliently from the outside against the associated ball or the associated ball-shaped element.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
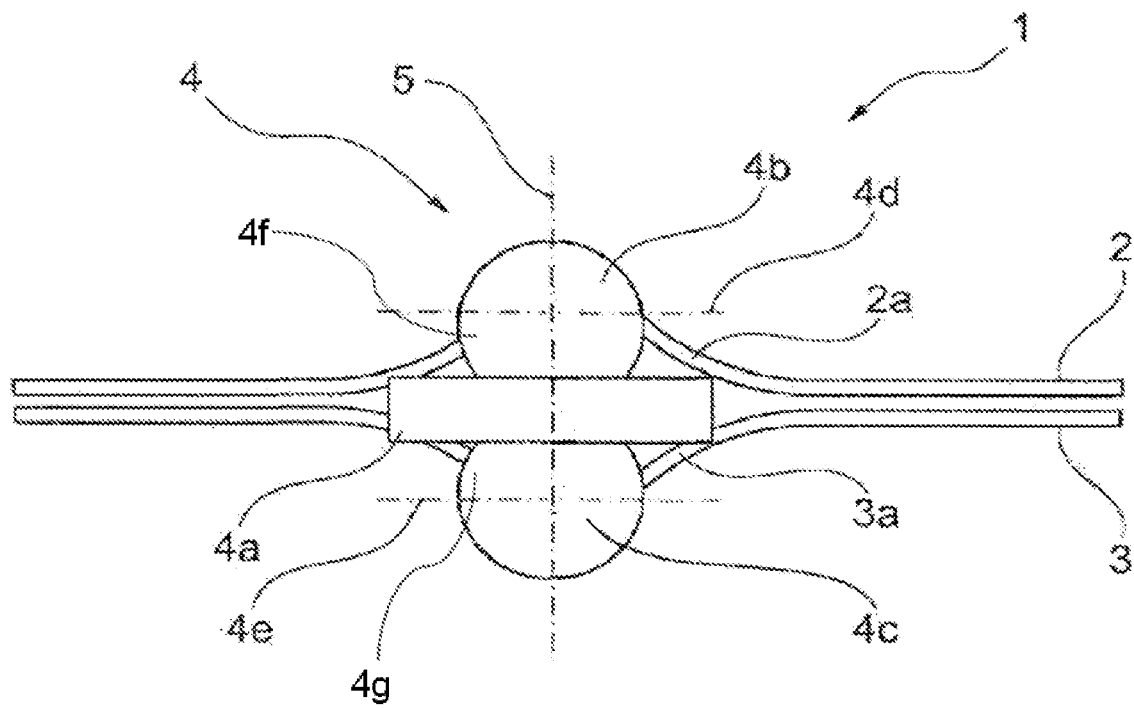
FIG. 1 is a schematic diagram of an exemplary embodiment of a component connection according to the invention.

FIG. 1 shows a component connection 1 having a first component 2 and a second component 3. The two components may be, for example, metal-sheet components. A first hole is provided in the first component 2. A second hole is provided in the second component 3. The two components 2, 3 are oriented in relation to one another such that the holes provided therein are approximately or precisely concentric with one another. A connecting element 4 extends through the holes. The connecting element 4 has two balls 4b, 4c connected to one another via a plate-like spacer 4a. The two balls 4b, 4c are arranged on opposite sides of the spacer 4a. The two balls 4b, 4c may be welded, for example, to the spacer 4a.

As can be seen from FIG. 1, center points of the two balls 4b, 4c are located on a straight line 5. An "undercut region" is located between a first equator plane 4d of the ball 4b and a second equator plane 4e of the ball 4c. The two equator planes 4d, 4e are perpendicular to the straight line 5. The portions of the balls 4b and 4c within equator planes 4d and 4e are engagement surfaces (4f, 4a) of balls 4b and 4c.

As can be seen from FIG. 1, a periphery 2a of the first hole, provided in the first component 2, extends into the undercut region, provided between the two equator planes 4d, 4e. It is likewise the case that a periphery 3a of the hole provided in the second component 3 extends into the undercut region, located between the equator planes 4d, 4e. This results, between the peripheries 2a, 3a of the two components 2, 3 and the connecting element 4, in a form fit which counters a pulling-apart action of the two components 2, 3.

In the case of the exemplary embodiment shown in FIG. 1, the peripheries 2a, 3a butt even with clamping action against the balls 4b, 4c, respectively, and this results in a friction fit in addition to the form fit.

It may be provided that not the entire encircling periphery of the holes projects into the undercut region or butts against the balls 4b, 4c.

Figure 2:
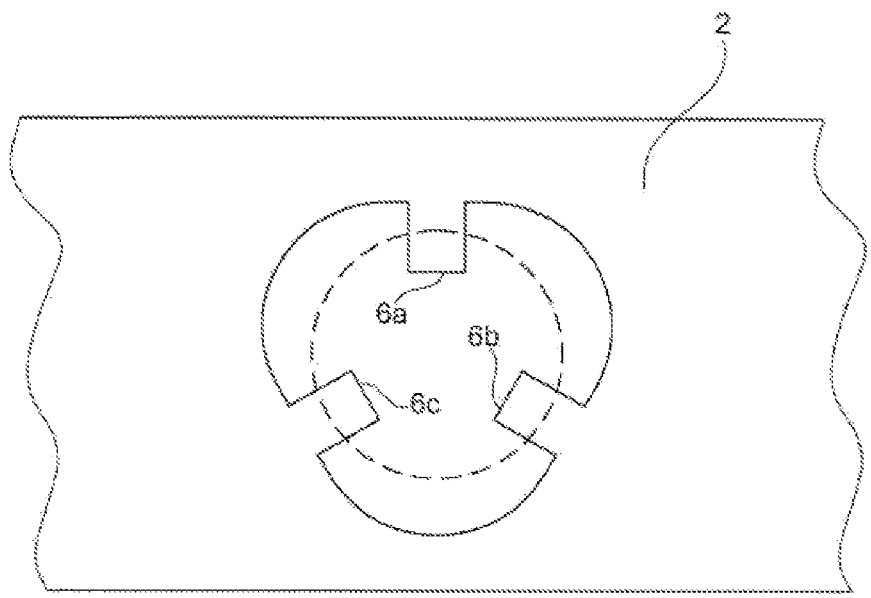
FIG. 2 is a schematic plan view of a component provided with a hole and having three clamping collars.

Rather, as illustrated in FIG. 2, it may be provided that the periphery of the hole provided in the second component 2 and/or in the third component 3 has a plurality of circumferentially distributed clamping-collar-like elements 6a, 6b, 6c which project obliquely upward and press against the associated ball 4b, 4c obliquely from beneath. The clamping-collar-like elements 6a, 6b, 6c may be connected in one piece with the relevant component 2. The hole and the clamping-collar-like elements 6a, 6b, 6c may be produced in the relevant component 2, for example, by punching, wherein, as can be seen from FIG. 1, the clamping-collar-like elements 6a, 6b, 6c (cf. FIG. 2) can be bent approximately obliquely upward.

In order to establish a component connection, as is shown in FIG. 1, all that is required is for the two components 2, 3 to be oriented concentrically with one another and clipped onto the balls 4b and 4c, respectively, of the connecting element 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component connection, comprising:
   a first sheet component having a first hole therethrough defining a first peripheral edge;
   a second sheet component having a second hole therethrough defining a second peripheral edge;
   wherein the first and second peripheral edges each comprise a plurality of bent clamping-collar elements which extend radially inwardly therefrom and are circumferentially distributed around the edge; and
   a connecting element comprising two ball-shaped elements connected to one another via a larger diameter spacer disposed therebetween, the two ball-shaped elements being affixed to opposing sides of the spacer and aligned such that centers of the two ball-shaped elements are located on a straight line perpendicular to a first equatorial plane of the first ball-shaped element and a second equatorial plane of the second ball-shaped element,
   wherein the first and second ball-shaped elements are inserted through the first and second holes such that a peripheral edge of each opposing side of the spacer contacts the bent clamping-collar elements of the first or second component, and such that a distal contact edge of each bent clamping-collar element contacts an engagement surface of the first or second ball-shaped element located between the first and second equatorial planes; and
   wherein the bent clamping-collar elements of the first component and the bent clamping-collar elements of the second component are bent away from each other, and the bent clamping-collar elements are flexurally elastic to exert a clamping force on the engagement surfaces of the first and second ball-shaped elements and such that a frictional connection is produced at the engagement surfaces that counters pulling-apart forces acting on the first and second components.

2. The component connection according to claim 1, wherein the first and second components are connected to one another solely via the clamping force exerted on the engagement surfaces of the connecting element by the bent clamping-collar elements.

3. The component connection according to claim 1, wherein each of the two ball-shaped elements are welded to a respective side of the spacer.

* * * * *